US011783302B2

(12) United States Patent
Vanderveen et al.

(10) Patent No.: US 11,783,302 B2
(45) Date of Patent: Oct. 10, 2023

(54) AUTHORIZATION OF VEHICLE REPAIRS

(71) Applicant: BlackBerry Limited, Waterloo (CA)

(72) Inventors: Michaela Vanderveen, Tracy, CA (US); Stephen John Barrett, Haywards Heath (GB)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/868,808

(22) Filed: May 7, 2020

(65) Prior Publication Data
US 2021/0350336 A1 Nov. 11, 2021

(51) Int. Cl.
*G06Q 10/20* (2023.01)
*G06Q 40/08* (2012.01)
*G07C 5/00* (2006.01)
*H04L 9/32* (2006.01)

(52) U.S. Cl.
CPC ............ *G06Q 10/20* (2013.01); *G06Q 40/08* (2013.01); *G07C 5/006* (2013.01); *G07C 5/008* (2013.01); *H04L 9/3213* (2013.01); *H04L 2209/84* (2013.01)

(58) Field of Classification Search
None
See application file for complete search history.

(56) References Cited

U.S. PATENT DOCUMENTS

| | | | | |
|---|---|---|---|---|
| 6,240,365 B1 * | 5/2001 | Bunn | ..................... | G07C 5/085 340/988 |
| 6,718,240 B1 * | 4/2004 | Suda | ..................... | B60N 2/0248 340/5.72 |
| 6,842,762 B2 * | 1/2005 | Raithel | ............... | B60R 16/0234 701/29.4 |
| 7,325,135 B2 * | 1/2008 | Fehr | ........................ | B62D 65/00 340/425.5 |
| 9,805,519 B2 * | 10/2017 | Ramanujam | ......... | G05D 1/0225 |
| 10,377,345 B1 * | 8/2019 | Oesterling | ............. | G06Q 10/02 |
| 10,489,132 B1 * | 11/2019 | Bloomcamp | ............. | G06F 8/65 |
| 10,719,813 B1 | 7/2020 | Beckmann | | |

(Continued)

FOREIGN PATENT DOCUMENTS

| | | |
|---|---|---|
| CA | 2566998 A1 | 6/2007 |
| CA | 3039675 | 4/2018 |

(Continued)

OTHER PUBLICATIONS

Intoxalock, "Car Repair and Maintenance with an Intoxalock Ingnition Interlock Device Installed", https://www.intoxalock.com/blog/author/intoxalock, Nov. 20, 2018. (Year: 2018).*

(Continued)

*Primary Examiner* — Paul R Fisher
(74) *Attorney, Agent, or Firm* — TROP, PRUNER & HU, P.C.

(57) ABSTRACT

In some examples, a vehicle receives authorization information that identifies an automotive service to be performed on the vehicle, the authorization information further indicating approval of performance of the automotive service on the vehicle by an operator of the vehicle and a vehicle manufacturer. Based on the authorization information, the vehicle enables access of an electronic component of the vehicle by an authorized repair entity to perform the automotive service.

20 Claims, 9 Drawing Sheets

(56) References Cited

U.S. PATENT DOCUMENTS

| | | | |
|---|---|---|---|
| 2007/0160206 A1* | 7/2007 | Ostrander | G06F 21/445 |
| | | | 380/220 |
| 2009/0049057 A1 | 2/2009 | Ghani | |
| 2010/0036599 A1 | 2/2010 | Froeberg | |
| 2010/0131304 A1* | 5/2010 | Collopy | G06Q 30/0269 |
| | | | 705/4 |
| 2011/0087505 A1* | 4/2011 | Terlep | G06Q 40/08 |
| | | | 705/4 |
| 2012/0313796 A1* | 12/2012 | Lee | B60Q 1/52 |
| | | | 701/2 |
| 2013/0158777 A1* | 6/2013 | Brauer | G06Q 10/20 |
| | | | 701/31.4 |
| 2013/0206495 A1* | 8/2013 | Westbrook | B60K 28/063 |
| | | | 180/272 |
| 2013/0214902 A1 | 8/2013 | Pineau | |
| 2013/0219170 A1* | 8/2013 | Naitou | G06F 21/85 |
| | | | 713/153 |
| 2014/0019280 A1 | 1/2014 | Medeiros et al. | |
| 2017/0134885 A1 | 5/2017 | Lortz | |
| 2017/0305368 A1* | 10/2017 | Markham | B60R 16/0231 |
| 2017/0310674 A1* | 10/2017 | Markham | H04L 9/0825 |
| 2019/0228383 A1 | 7/2019 | Abler | |
| 2019/0274018 A1* | 9/2019 | Mosenia | H04W 4/48 |
| 2020/0171944 A1* | 6/2020 | Hanna | B60R 25/007 |
| 2020/0202636 A1 | 6/2020 | Andres | |

FOREIGN PATENT DOCUMENTS

| | | | | |
|---|---|---|---|---|
| CN | 103886657 A * | 6/2014 | | G07C 9/00 |
| CN | 108234282 A | 6/2018 | | |
| CN | 110061984 A | 7/2019 | | |
| DE | 202012009432 U1 * | 10/2012 | | E05B 65/12 |
| EP | 1669857 A1 * | 6/2006 | | G06F 9/44 |
| GB | 2565147 A | 2/2019 | | |
| KR | 20180062072 A * | 8/2016 | | H04L 9/32 |
| WO | WO2005081650 A2 * | 9/2005 | | |
| WO | WO2006122263 A2 * | 11/2006 | | G06F 19/00 |
| WO | WO2019040651 A1 * | 2/2019 | | H04L 9/32 |

OTHER PUBLICATIONS

Draeger Interlock, Inc., "Ignition Interlock System—User Manual", www.ignitioninterlock.com, 2002. (Year: 2002).*
Mitch Becker, "Vehicle Ignition Interlock Devices: What You Need to Know", https://www.bodyshopbusiness.com/vehicle-ignition-interlock-devices-what-you-need-to-know/, Mar. 7, 2011. (Year: 2011).*
Philipp Mundhenk, Andrew Paverd, Artur Mrowca, Sebastian Steinhorst, Martin Lukasiewycz, Suhaib A. Fahmy, and Samarjit Chakraborty. 2017. Security in Automotive Networks: Lightweight Authentication and Authorization. ACM Trans. Des. Autom. Electron. Syst. 22, 2, Article 25 (Apr. 2017), 27 pages. (Year: 2017).*
T. Kim and S. Park, "Compare of Vehicle Management over the Air and On-Board Diagnostics," 2019 International Symposium on Intelligent Signal Processing and Communication Systems (ISPACS), 2019, pp. 1-2 (Year: 2019).*
M. Steger et al., "An Efficient and Secure Automotive Wireless Software Update Framework," in IEEE Transactions on Industrial Informatics, vol. 14, No. 5, pp. 2181-2193, May 2018, doi: 10.1109/TII.2017.2776250 (Year: 2018).*
D. Eastlake, Internet Engineering Task Force (IETF), Request for Comments: 6066, Obsoletes: 4366, Category: Standards Track, ISSN: 2070-1721, Transport Layer Security (TLS) Extensions: Extension Definitions, Jan. 2011 (25 pages).
D. Hardt, Internet Engineering Task Force (IETF), Request for Comments: 6749, Obsoletes: 5849, Category: Standards Track, ISSN: 2070-1721, The OAuth 2.0 Authorization Framework, Oct. 2012 (76 pages).
IEEE Standard for Wireless Access in Vehicular Environments—Security Services for Applications and Management Messages, IEEE Vehicular Technology Society, IEEE Std 1609.2™-2016 (Revision of IEEE Std 1609.2-2013) (241 pages).
Crackberry, BlackBerry unveils new Spark 'Enterprise of Things' platform, Sep. 12, 2018 (6 pages).
Blackberry, Blackberry Intelligent Security—Product Overview, Nov. 2019 (13 pages).
Blackberry, Datasheet, CylancePERSONA, Feb. 20, 2020 (4 pages).
W3C, Vehicle Information Service Specification, W3C Editor's Draft, Jan. 7, 2020 (65 pages).
Yun et al., Enabling Safe & Secure Connection to an In-vehicle Network (IVN), IEEE, 2014 (2 pages).
Mehra et al., Secure Remote Diagnostics of a Vehicle Using UGP, IEEE, 2017 (6 pages).
Kharche et al., UDS Implemetation for ECU I/O Testing, 2018 3rd International Conference on Intelligent Transportation Engineering, IEEE 2018 (4 pages).
European Patent Office, Extended European Search Report for Appl. No. 21158444.6 dated Jun. 9, 2021 (8 pages).
Lucas Mearian; Computerworld; entitled "Verizon unveils aftermarket vehicle diagnostics service"; www.computerworld.com/article/2868475/verizon-unveils-aftermarket-vehicle-diagnostics-service.html; 4 pages; Jan. 2015.
Kyle Schurman; "The best OBDII scanner"; Best Reviews, Tribune Content Agency LLC.; 5 pages; Sep. 2019.
Total Car Diagnostics Support, Alex E.; "How to Install ELM327 Wifi OBD Scanner on Android/Apple iOS"; www.totalcardiagnostics.com/support/Knowledgebase/Article/View/77/0/how-to-install-elm327-wifi-obd-scanner-on-androidapple-ios; 2 pages; Oct. 2014.
Anonymous; "Featured New Products"; Professional Tool & Equipment News, vol. 31, (2); 9 pages; Mar. 2020.
Fred Lambert "Tesla launches a new car-sharing feature to simplify access" Jun. 9, 2020 https://electrek.co/2020/06/09/tesla-new-car-sharing-feature-access/ (Year: 2020) (13 pages).
Manfred Klaus, Plan.Net, Auto 2020: A Smartphone on wheels, Sep. 11, 2017 (translated by Google Translation) (8 pages).
Wikipedia, Connected car last edited Jul. 27, 2020 (11 pages).
autointegrate.com, Repair authorization for fleet management, Improving Fleet Management downloaded May 26, 2020 (10 pages).
Robinson, Jessie, Streamlining the Maintenance Authorization Process, Apr. 24, 2018 (10 pages).
Vanderveen et al., U.S. Appl. No. 16/988,161 entitled Vehicle Service Authorization filed Aug. 7, 2020 (35 pages).
Anonymous "10 Innovative Use Cases of IoT in the Transport and Logistics Sector," M2 Presswire, 2018 (3 pages).
European Patent Office, Communication pursuant to Article 94(3) EPC for Appl. No. 21158444.6 dated Apr. 19, 2023 (8 pages).

* cited by examiner

AUTHORIZATION OF VEHICLE REPAIRS

BACKGROUND

An operator of a vehicle may bring the vehicle to a repair facility to perform maintenance and/or repair on the vehicle. The nature of the work to be performed on the vehicle is typically agreed to verbally or via signature on a physical document at the repair facility. The vehicle operator's verbal agreement or signed acknowledgment provides the authorization for the repair facility to perform the work.

In some cases, the manufacturer of the vehicle may suggest services to be performed on the vehicle. The suggested services can be part of a recall campaign, a regularly scheduled maintenance, or any other type of service that the manufacturer deems should be performed on the vehicle.

When the vehicle's operator takes the vehicle to the repair facility, the vehicle's operator and the repair facility will discuss the services to be performed on the vehicle, and after the vehicle operator has given a verbal approval or approval by signing a physical document, the repair facility proceeds to perform the services on the vehicle.

BRIEF DESCRIPTION OF THE DRAWINGS

Some implementations of the present disclosure are described with respect to the following figures.

Figure 1:
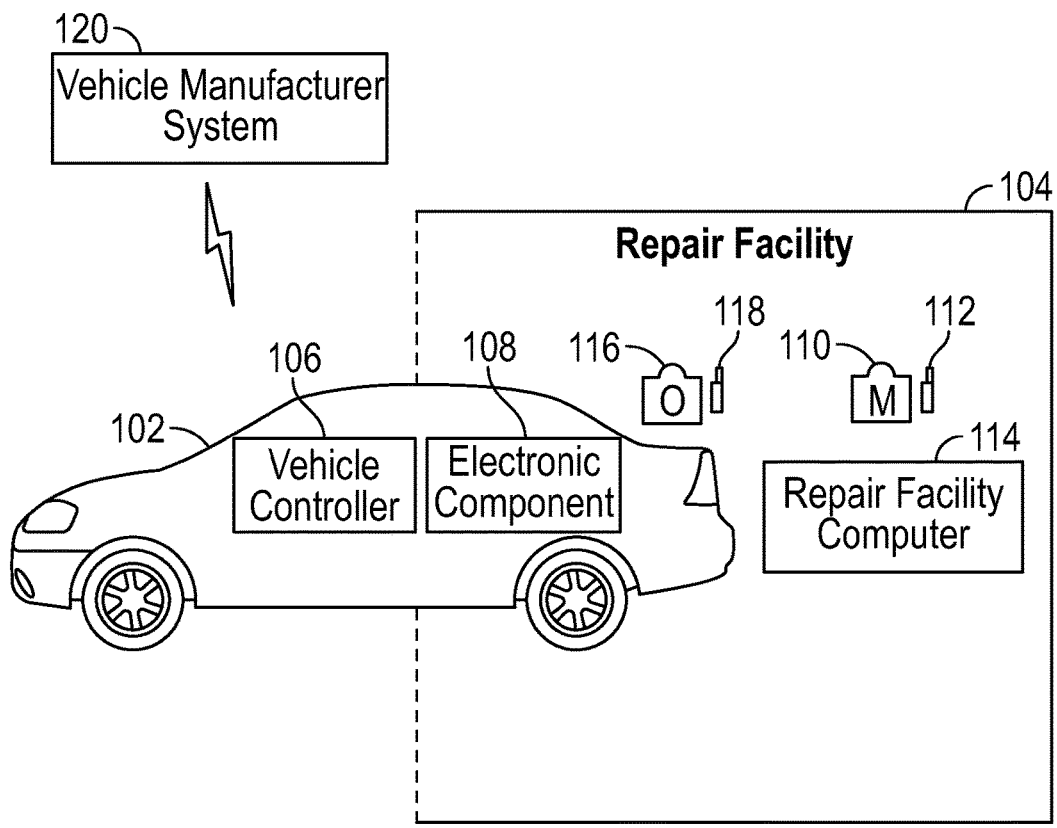
FIG. 1 is a block diagram of an example arrangement that includes a vehicle, a repair facility, and a vehicle manufacturer system, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Examples of vehicles include motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., space planes, space shuttles, space capsules, space stations, satellites, etc.), watercraft (e.g., ships, boats, hovercraft, submarines, etc.), railed vehicles (e.g., trains and trams, etc.), bicycles and other types of vehicles including any combinations of any of the foregoing, whether currently existing or after arising.

After a vehicle's operator has given authorization (either verbally or in written form) to a repair facility to perform an automotive service on a vehicle, the operator has no way to determine or verify that the automotive service performed by the repair facility was an automotive service authorized or was an automotive service that is approved by a manufacturer of the vehicle. An "operator" of a vehicle can refer to an owner of the vehicle or a driver of the vehicle or any other person that is to make a decision regarding an automotive service to be performed on the vehicle.

A "repair facility" can refer to any facility that can perform an automotive service on a vehicle, where the automotive service can include a repair or replacement of a malfunctioning part of the vehicle, or a maintenance of the vehicle to keep the vehicle in good working condition. A repair facility can be a facility at a vehicle dealer, or a facility that is separate from the vehicle dealer.

Traditionally, techniques or mechanisms are not provided to allow both an operator of the vehicle and a manufacturer of the vehicle to authorize, in an automated way, an automotive service performed on the vehicle. Moreover, there is no easy way to verify that the automotive service performed was an automotive service that was authorized by both the vehicle's operator and the manufacturer.

In accordance with some implementations of the present disclosure, techniques or mechanisms are provided to allow for verification that authorization for an automotive service to be performed on the vehicle has been obtained from both an operator of the vehicle and from the manufacturer of the vehicle.

FIG. 1 is a block diagram of an example arrangement in which a vehicle 102 has been brought into a repair facility 104. The vehicle 102 includes a vehicle controller 106 that can control various electronic components (an electronic component 108 shown in FIG. 1) of the vehicle 102, and that has external connectivity (e.g., a Telematics Control Unit and/or a gateway). As used here, a "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

The electronic component 108 may include any of various different types of electronic components. Examples of electronic components include Electronic Control Units (ECUs) or other types of electronic components. For example, the electronic component 108 can include a port that can be used by an external entity, such as a mechanic's handheld device 112 under the control of a mechanic 110 at the repair facility 104, to access data and further electronic components of the vehicle 102. As an example, the port can include an on-board diagnostics (OBD-II) port, which the mechanic 110 can use to access the data and/or further electronic components of the vehicle 102, via their device 112. For example, the mechanic 110 can use the handheld device 112, such as an OBD handheld scanner or other type of handheld electronic device (e.g., a smart phone, etc.) to connect to the OBD port (108) to communicate with the vehicle 102. In some examples, the OBD port can include an OBD-II port. In other examples, other types of ports can be employed.

The data that can be accessed by the mechanic 110 through an OBD port (108) can include diagnostic data that can indicate which component(s) of the vehicle 102 is (are)

malfunctioning or has (have) to be serviced as part of regular maintenance. The OBD port can also be used by the mechanic 110 to initiate diagnostics at the vehicle 102, such as to run tests at the vehicle 102 for determining which component(s) may be malfunctioning. The OBD port can also be used by the mechanic 110 to communicate or interact with further electronic components of the vehicle, such as ECUs for various subsystems (e.g., an engine, a transmission, a brake, etc.) of the vehicle 102.

In further examples, instead of or in addition to using the handheld electronic device 112 to access the electronic component 108 (e.g., a port), the mechanic 110 can use a repair facility computer 114 to connect to the electronic component 108 to establish communications with the vehicle 102.

FIG. 1 further depicts an operator 116 of the vehicle 102. The operator 116 has a handheld electronic device 118, such as a smart phone or other type of handheld electronic device. In some cases, the operator 116 can include the owner of the vehicle 102. In other examples, the operator 116 can include a different person (e.g., a driver or another person). In the latter examples, the owner can be remotely located from the repair facility 104, but the vehicle controller 106 may be able to communicate with the remote owner (or more specifically, an electronic device associated with the remote owner) over a network, such as a wireless network.

FIG. 1 further shows a vehicle manufacturer system 120, which can include a computer (or an arrangement of computers). The vehicle manufacturer system 120 is able to communicate over a wireless network with the vehicle controller 106. In some examples, the vehicle manufacturer system 120 can be part of a cloud, a web server, and so forth. For example, if the vehicle controller 106 includes a Telematics Control Unit, then the Telematics Control Unit can communicate with the cloud (e.g., the Telematics Control Unit can receive information from the cloud to cause opening of an OBD-II port that may be part of the electronic component 108). Also, in some examples, the Telematics Control Unit can communicate with the electronic component 108 through a central gateway (not shown).

Figure 2:
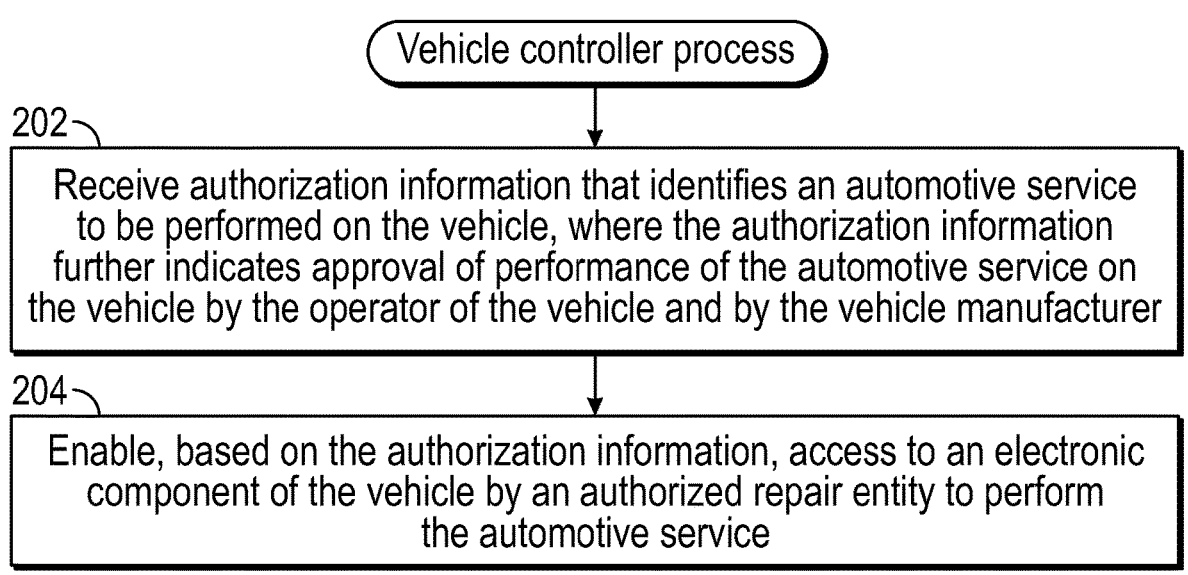
FIG. 2 is a flow diagram of a process of a vehicle controller in a vehicle, according to some implementations of the present disclosure.

FIG. 2 is a flow diagram of a process of the vehicle controller 106 according to some examples. The vehicle controller 106 receives (at 202) authorization information that identifies an automotive service to be performed on the vehicle 102, where the authorization information further indicates approval of performance of the automotive service on the vehicle 102 (e.g., an automotive service to be performed with respect to one or more ECUs or other components) by the operator 116 of the vehicle 102 and by the vehicle manufacturer (sometimes referred to as an original equipment manufacturer or OEM) that is associated with the vehicle manufacturer system 120. The authorization information that indicates approval of performance of the automotive service by the operator 116 can be received from the handheld electronic device 118 associated with the operator 116, or by a different computing device. Note that the operator 116 that provided authorization of the authorization of the automotive service may be the driver of the vehicle 102 or an owner that is remotely located from the repair facility 104. The authorization information indicating approval of performance of the automotive service by the vehicle manufacturer can be received from the vehicle manufacturer system 120.

Authorization indicating approval of performance of an automotive service can include a specific unique identifier of the automotive service, a description of the automotive service, a list of affected electronic components, or any other information that is useable to make a determination of what automotive service is being referred to. For example, the authorization information can be in the form of one or more authorization tokens. An authorization token or more generally a security token, sometimes also referred to as an access token, can be a digital data element associated with any of the following protocols: OAuth 2.0, OpenID, Secure Token Service (STS) based on SAML (Secure Assertion Markup Language), other security tokens as in Amazon web services Secure Token Service (STS), and so forth. Information associated with an automotive service may contain an identifier of the software or firmware code and/or an identifier of a regulation, law or standard with which this automotive service aims to achieve compliance for that vehicle. For example, an automotive service may apply a software or firmware patch to comply with a regulation, law or standard. A software or firmware patch refers to machine-readable instructions that can be used to repair or replace software or firmware code in the vehicle. The regulation may be for all vehicles by a regulatory agency, or it may be just for that vehicle and a particular operator, by law enforcement agency (e.g., a breathalyzer installed per court order).

The vehicle controller 106 enables (at 204), based on the authorization information, access to an electronic component (e.g., the electronic component 108) of the vehicle 102 by an authorized repair entity to perform the automotive service. The authorized repair entity can be the repair facility 104 or can be a specific mechanic 110. The authorization information can further identify the authorized repair entity approved to perform the automotive service, where the enabling of the access of the electronic component is responsive to verifying that a repair entity attempting to perform the automotive service is the authorized repair entity identified by the authorization information. Additionally, the authorization information indicates a time interval during which the approval of the performance of the automotive service is valid.

In some examples, the enabling of the access of the electronic component of the vehicle to perform the automotive service by the repair entity is further based on detecting, by the vehicle, that the vehicle is within a specified proximity (using a short-range communication as discussed further below) of at least one of the operator of the vehicle and the repair entity.

Prior to enabling access to the electronic component 108 of the vehicle, the electronic component 108 (e.g., a diagnostic port) may be in a state that does not accept or respond to requests from an electronic device (e.g., 112 or 114 in FIG. 1) associated with the authorized repair entity. For example, the electronic component may ignore or discard requests for data or requests for access of further electronic components received from the electronic device associated with the authorized repair entity. Alternatively, to be able to access the electronic component 108, the electronic device associated with the authorized repair entity would have to provide a credential (e.g., a password, a passcode, etc.), a key, or any other information that the electronic component 108 uses to allow access of the electronic component 108. Enabling access of the electronic component 108 can refer to configuring the electronic component 108 to a state that accepts requests (from the electronic device associated with the authorized repair entity) to access data or further electronic components through the electronic component 108. Alternatively, enabling access of the electronic component 108 can refer to providing the electronic device associated with the authorized repair entity with information (e.g., a credential, a key, etc.) that can be submitted by the electronic device associated with the authorized repair entity to access the electronic component 108.

In some examples, the diagnostic port can be closed when the vehicle 102 is initially brought into the repair facility 104. The diagnostic port being "closed" refers to the diagnostic port not allowing the vehicle by an external entity, such as by the handheld electronic device 112 of the mechanic 110 or by the repair facility computer 114. When the diagnostic port is closed, no diagnostics or repairs on the vehicle 102 are allowed.

1. Grants and Checks

Generally, in some implementations of the present disclosure, the authorization of an automotive service may involve four entities: the vehicle manufacturer, the operator 116 (via the operator's device 118), the authorized repair entity (either the repair facility 104 or the mechanic 110 via the mechanic's device 112), and the vehicle 102. In some examples, authorization of the automotive service can be performed using a series of grants and checks. The vehicle manufacturer and the operator 116 are the providers of authorization, and the vehicle 102, and possibly the repair entity, are the authorization checkers.

In some examples, before an automotive service is allowed to commence on a vehicle, any or all of the following grants and checks may be performed:

Grant 1: The operator 116 authorizes a particular mechanic to perform the automotive service, within a certain period of time, and possibly within a certain cost estimate.

Grant 2: The vehicle manufacturer grants authorization for the particular mechanic to perform the automotive service within a certain period of time.

Check 1 and sub-checks: The vehicle 102 authenticates the mechanic and verifies the mechanic's authorization given by the vehicle manufacturer (part 1), and also by the operator 116 (part 2). In some examples, Check 1 can include an implicit authorization that both the vehicle manufacturer and the operator 116 have authorized the mechanic. In some examples, an implicit authorization can refer to the operator 116 implicitly authorizing the mechanic via a signalling sequence that is a priori to all parties, and an authorization from the vehicle manufacturer includes the operator's authorization too (implicitly means that the operator 116 has also provided authorization, because the prescribed signalling is such that the vehicle manufacturer does not issue a token until the vehicle manufacturer has first received authorization from the operator 116).

Check 2 (optional): The mechanic may authenticate the vehicle 102.

The above series of grants and checks can employ signaling that involves all 4 entities, and the sets of bilateral authorization grants and checks. The operator 116 is brought into diagnostic signaling (including via cloud). In some examples, the signaling can be according to any or some combination of the following protocols: OAuth 2.0, which is a web based authorization protocol; International Organization for Standardization (ISO) 13185 (2015) Unified Gateway Protocol (UGP), which is a protocol between a diagnostic tool and the gateway ECU in a vehicle; and so forth.

In further examples, instead of or in addition to the vehicle manufacturer, other parties can be brought into the authorization process, such as an insurance company, a legal entity (public safety entity or entity in charge of assessing compliance with a law, regulation, or standard, e.g., a rule specifying that breathalyzers have to be installed). In these cases, additional signaling can involve messages to/from the insurance company server (or other server).

In some examples, in addition to the authorization process based on FIG. 2 or based on the grants and checks discussed above, proximity of the operator 116 and of the mechanic 110 is also confirmed before an automotive service can be performed on the vehicle.

2. Short-Range Communication Based Authorization

In further examples, authorization of an automotive service can further be based on proximity of the vehicle operator 116 and/or the mechanic 110 to the vehicle 102 at the repair facility 104. The proximity can be detected based on use of short-range communications between the vehicle 102 and the handheld device 118 and/or 112 associated with the vehicle operator 116 and/or the mechanic 110.

The short-range communications can include Bluetooth communications, Near-Field Communication (NFC) communications, Radio-Frequency Identification (RFID) communications, optical communications (e.g., infrared or IR communications), or any other type of wireless communications in which the effective range between electronic devices is less than a specified short distance (e.g., less than 50 meters, less than 10 meters, less than 5 meters, etc.). For short-range communications, if electronic devices are physically separated by the specified short distance, then the electronic devices would be out of range of one another and thus would not be able to successfully communicate with one another.

In other examples, proximity can be detected based on using a camera to capture an image. For example, the operator's handheld device 118 and/or the mechanic's handheld device 112 can be used to capture a barcode, a quick response (QR) code, or another identifier that may be physically on the vehicle 102, for example displayed in an Automotive Head Unit.

In some examples, using short-range communications, the vehicle controller 106 (FIG. 1) can receive information from the operator's handheld device 118 regarding what type of automotive service the operator 116 is authorizing. Additionally, using short-range communications, the vehicle controller 106 (FIG. 1) can receive information from the mechanic's handheld device 112 information relating to the vehicle 102 and/or the automotive service to be performed, such as any of the following: the vehicle model, the vehicle serial number, another identifier of the vehicle (e.g., vehicle identification information or VIN), information of a requested access type, information relating to the automotive service to be performed by the mechanic 110, information on the affected electronic components, and so forth.

The vehicle controller 106 verifies that the operator 116 and the mechanic 110 are in close proximity to the vehicle 102, based on use of short-range communications, or based on use of a camera to capture an identifier on the vehicle 102.

In some examples, the vehicle controller 106 can send the information received from the operator's handheld device 118 and/or the mechanic's handheld device 112 to the vehicle manufacturer system 120 (FIG. 1) for verification.

If the vehicle manufacturer system 120 sends back an indication that the information has been verified, then the vehicle controller 106 can enable the diagnostic port. For example, the vehicle manufacturer system 120 can send a "OBD-II firewall setting" for temporarily opening the diagnostic port. An example of specifying this firewall setting is a list of approved OBD-II Parameter IDs (PIDs), which are codes used to request certain data from a vehicle. In another example, a list of ECU identifiers identifying the components with which access is allowed (such as to replace software or firmware) to take place can be used in constructing firewall settings to allow access to the diagnostic port.

In some examples, the vehicle manufacturer system 120 can send back to the vehicle controller 106 a granular configuration (e.g., contained in configuration information that allows selective access of portions of the vehicle 102 by the mechanic 110. For example, the granular configuration may allow access to only to the parts of the vehicle 102 that are required to complete the automotive service.

3. Token-Based Multi-Party Authorization

3.0 Series of Grants and Checks

As noted above in Section 1, the authorization of an automotive service involves four entities: the vehicle manufacture, the operator 116, the mechanic 110, and the vehicle 102, which can involve a series of grants and checks (including Grant 1, Grant 2, Check 1, and Check 2 listed in Section 1).

3.1 Authorization/Authentication Related to Grants and Checks 3.1.1 Grant 1

Grant 1: The operator 116 authorizes a particular mechanic to perform the automotive service, within a certain period of time ("authorization time window"), and possibly within a certain cost estimate. Grant 1 can be instantiated as a process via the cloud (e.g., the vehicle manufacturer system 120 of FIG. 1), where the operator 116 uses an application or website to authorize a mechanic. The authorization can result in an authorization token provided by the vehicle manufacturer system 120 to the vehicle 102. Alternatively, the vehicle manufacturer system 120 can direct the operator 116 and the mechanic 110 to exchange application-level information (e.g., QR codes) directly via their devices 118 and respectively 112, and/or via the vehicle's system, still using their devices.

By authorizing the particular mechanic, another mechanic not approved by the operator 116 will not be able to perform the authorized service.

Also, by authorizing the particular mechanic to perform a specific automotive service, the particular mechanic would not be able to perform another automotive service that was not authorized by the operator 116, or the particular mechanic would not be able to perform the authorized service outside the authorization time window (either before or after the authorization time window). For example, this may prevent the particular mechanic from updating an ECU of the vehicle 102 after the update may no longer be valid or before the update is valid.

The authorization of grant 1 can be provided directly, indirectly and/or implicitly by the operator 116 to both the vehicle 102 and the mechanic 110.

For example, the operator 116 (or the electronic device, e.g., 118, associated with the operator 116) provides, directly to the vehicle 102 (more specifically, the vehicle controller 106), authorization information (e.g., a digital authorization token), so that vehicle controller 106 can verify authorization information (e.g., an authorization token) that the mechanic 110 presents to the vehicle controller 106. As a more specific example, the operator 116 can access the vehicle's infotainment graphical user interface (GUI) (e.g., an Automotive Head Unit), and can enter, through this GUI, an identifier of the mechanic 110). Alternatively, the operator's handheld device 118 and vehicle's infotainment system can exchange information pertaining to the repair entity, e.g., a human user selects the mechanic from a drop-down list. Once this information is entered, the vehicle controller 106 knows that the identified mechanic 110 has been authorized (i.e., the vehicle controller 106 can authorize an automotive service to be performed by the mechanic 110 that presents the vehicle controller 106 with the mechanic's identity, such as in a digital certificate sent by an electronic device associated with the mechanic 110). The foregoing solution does not involve a cloud (e.g., the vehicle manufacturer system 120).

In another example, the operator 116 can indirectly (e.g., via the vehicle manufacturer cloud such as implemented with the vehicle manufacturer system 120) provide authorization to the mechanic 110.

In a further example, the operator 116 can indirectly (e.g., via the vehicle manufacturer cloud) provide authorization information to the vehicle controller 106 regarding the mechanic 110 so that the vehicle controller 106 can verify the authorization information, e.g., a digital authorization or other type of token, that the mechanic 110 presents to the vehicle controller 106.

In another example, the operator 116 can implicitly authorize the mechanic 110, such as based on use of a specified signaling sequence in which the vehicle manufacturer does not issue an authorization token until the vehicle manufacturer has first received authorization from the operator 116, and this practice is known by all system participants to be accurate.

3.1.2 Grant 2

Grant 2: The vehicle manufacturer grants authorization for the particular mechanic to perform the automotive service within a certain period of time ("authorization time window"). This authorization should (but does not have to) be granted based on the operator's authorization.

The authorization granted by the vehicle manufacturer can be instantiated as a security token (e.g., a digital authorization token) sent by cloud (e.g., the vehicle manufacturer system 120) to the mechanic's device (e.g., the handheld device 112 or the repair facility computer 114).

By authorizing the particular mechanic, another mechanic, not approved by the vehicle manufacturer, or approved by the vehicle manufacturer but not approved by the operator 116, may perform the automotive service.

Moreover, the particular mechanic is prevented from performing a non-authorized automotive service, and is prevented from performing the authorized automotive service outside the authorization time window.

The authorization of grant 2 is provided directly, indirectly or implicitly to both the vehicle 102 and the mechanic 110.

The authorization can be performed at the vehicle manufacturer cloud (e.g., implemented with the vehicle manufacturer system 120). For example, the vehicle manufacturer system 120 can send to each of the mechanic 110 and the vehicle 102 a respective different authorization token or the same authorization token. The authorization token can be sent over separate secure channels between the vehicle manufacturer system 120 and the respective vehicle 102 and the electronic device (e.g., 112 or 114) associated with the mechanic 102.

The authorization token sent to each of the vehicle 102 and the mechanic 110 may be in response to a request sent from the operator 116 or the mechanic 110 to the vehicle manufacturer system 120.

3.1.3 Check 1

Check 1: The vehicle 102 authenticates the mechanic and verifies the mechanic's authorization given by the vehicle manufacturer (part 1), and also by the operator 116 (part 2), or both together (implicit).

Check 1 can be instantiated as a check at the vehicle 102 on the authorization token from the vehicle manufacturer (if the authorization token includes an authorization from the operator 116), or separately check the authorization token from the vehicle manufacturer and the authorization token from the operator 116.

Check 1 prevents another mechanic, not approved by the vehicle manufacturer, or approved by the vehicle manufacturer but not chosen by the operator 116, from performing an automotive service. Moreover, the particular mechanic is prevented from performing a non-authorized automotive service, and is prevented from performing the authorized automotive service outside the authorization time window.

For check 1, part 1, the mechanic 110 can present the vehicle 102 with an authorization token. The vehicle controller 106 can validate the authorization token if either of the options is satisfied. With a first option, a digital signature verification is performed. The vehicle stores a pre-stored public key of the vehicle manufacturer system 120, and the vehicle controller 106 can check that the authorization token has been signed by the vehicle manufacturer. The authorization token includes an identifier (e.g., a VIN) of the vehicle 102 in addition to information of the automotive service.

With a second option, a token data comparison is performed. The vehicle 102 is provided with a copy of the authorization token directly from the vehicle manufacturer system 120, so that the vehicle controller 106 can perform a comparison of the authorization token from the mechanic 110 with the authorization token from the vehicle manufacturer system 120.

Alternatively, to perform check 1, part 1, the vehicle 102 can directly seek authorization from the vehicle manufacturer system 120.

For check 1, part 2, the mechanic 110 presents the vehicle 102 with an authorization token. To validate the authorization token, the vehicle 102 can use a pre-stored digital public key infrastructure (PKI) key of the operator 116, so that the vehicle controller 106 can check that the operator 116 has indeed signed the authorization token.

Alternatively, the operator 116 can directly present the vehicle 102 with an authorization token. The operator 116 may, for example, use a GUI in the vehicle's infotainment system (such as to enter a username and password in an application so that the operator 116 can type in the identity of the mechanic 110, and other information such as scope of allowed service.

Check 1, implicit, can check both grant 1 and grant 2 in one operation. For example, the mechanic 110 presents the vehicle 102 with an authorization token. The authorization from both the operator 116 and the mechanic 110 can be implicit in the signalling flow. In this example, the vehicle manufacturer system 120 will only issue to the mechanic 110 an authorization token after the vehicle manufacturer system 120 has received an authorization from the operator 116 for the automotive service to commence. In this case, the vehicle controller 106 only has to be presented with the authorization token from the mechanic 110, and the vehicle 102 hears nothing from the vehicle manufacturer system 120, but trusts that the authorization token presented to the vehicle 102 by the mechanic 110, e.g., by verifying the vehicle manufacturer's digital signature (whom the vehicle 102 trusts intrinsically) included in that token.

In some examples, to validate the authorization token, the vehicle 102 can store a signing (i.e., public) key of the vehicle manufacturer. The vehicle manufacturer may have one or more public keys. Alternatively, instead of an authorization token, the vehicle manufacturer system 120 can directly inform the vehicle 102 that the operator authorization has been granted (e.g., via a secure signalling procedure between vehicle 102 and vehicle manufacturer system 120).

3.1.4 Check 2

Check 2 (optional): The mechanic may authenticate the vehicle 102. Check 2 may be performed using the mechanic's electronic device, such as the handheld device 112 or the repair facility computer 114. In some examples, check 2 may be based on a cryptographic authorization token sent by the vehicle controller 106 to the mechanic's electronic device. The cryptographic authorization token may be used to verify an authorization provided by the vehicle manufacturer to the mechanic for a specific vehicle, such as identified by a VIN.

Check 2 prevents a vehicle from receiving an automotive service unless authorized (such as based on payment for the automotive service by the operator 116).

For check 2, the vehicle 102 presents the mechanic 110 with an authorization token. The mechanic 110 (or more specifically, an electronic device associated with the mechanic 110) can validate the authorization token, which can be performed in any of the following manners.

With a first option, the mechanic's electronic device has a pre-stored public key of the vehicle manufacturer system 120, or that public key can be looked up on the fly, and can check that the authorization token has been signed by the vehicle manufacturer. In the first option, the vehicle 102 would have had to a priori received the authorization token from the vehicle manufacturer.

With a second option, the mechanic's electronic device is provided with a copy of the authorization token directly from the vehicle manufacturer upon authorization, so that the mechanic's electronic device to compare the authorization tokens. As with the first option, the vehicle controller 106 would have had to a priori received the authorization token from the vehicle manufacturer.

3.3 Post-Service Checks and Verification of Service Completion

After the authorized service is completed, the vehicle controller 106 can notify the vehicle manufacturer system 120 of the completion, and the vehicle manufacturer system 120 can notify the operator 116 about the results of the automotive service.

The vehicle manufacturer system 120 can use diagnostics information retrieved from the vehicle 102 (such as using a diagnostic port of the vehicle 102, e.g. on the electronic component 108) to determine whether the automotive service was successfully completed. For example, the vehicle manufacturer system 120 can confirm that a new ECU has been installed (replaced) in the vehicle 102, and that the new ECU is an authentic part (the cryptographic signature of the new ECU is validated). In case an ECU has been upgraded with new firmware or software, that change can also be validated by the vehicle manufacturer. The vehicle manufacturer system 120 can also check that oil level has changed (e.g., if an oil change is being charged for).

The post-automotive service check can help catch unauthorized repairs of the vehicle 102, such as requested by a driver of the vehicle 102 who brought the vehicle 102 to the repair facility 104 but who is not also the owner (in other words, bringing the car to a mechanic does not equate owner consent). The post-automotive service check can also indicate whether the mechanic 110 performed an automotive service that was not pre-authorized, and if so, what were the changes that were done, e.g., what electronic components were changed.

In some cases, a further automotive service can be requested after an original automotive service is authorized. The mechanic 110 initiates this process by requesting the vehicle manufacturer system 120 for authorization, and the authorization is granted from both the vehicle manufacturer and the operator 116. The same grants and checks discussed above can be used for the further automotive service, with a possible difference that the trigger is signaling from the mechanic to the vehicle manufacturer system 120. The operator 116 has to be notified in order to authorize, e.g., via an application at the operator's handheld device 118.

3.4 Example Message Flows

The different ways in which the checks are performed could result in a large number of different signaling flows. There are many possible approaches, some examples are given below.

Figure 3:
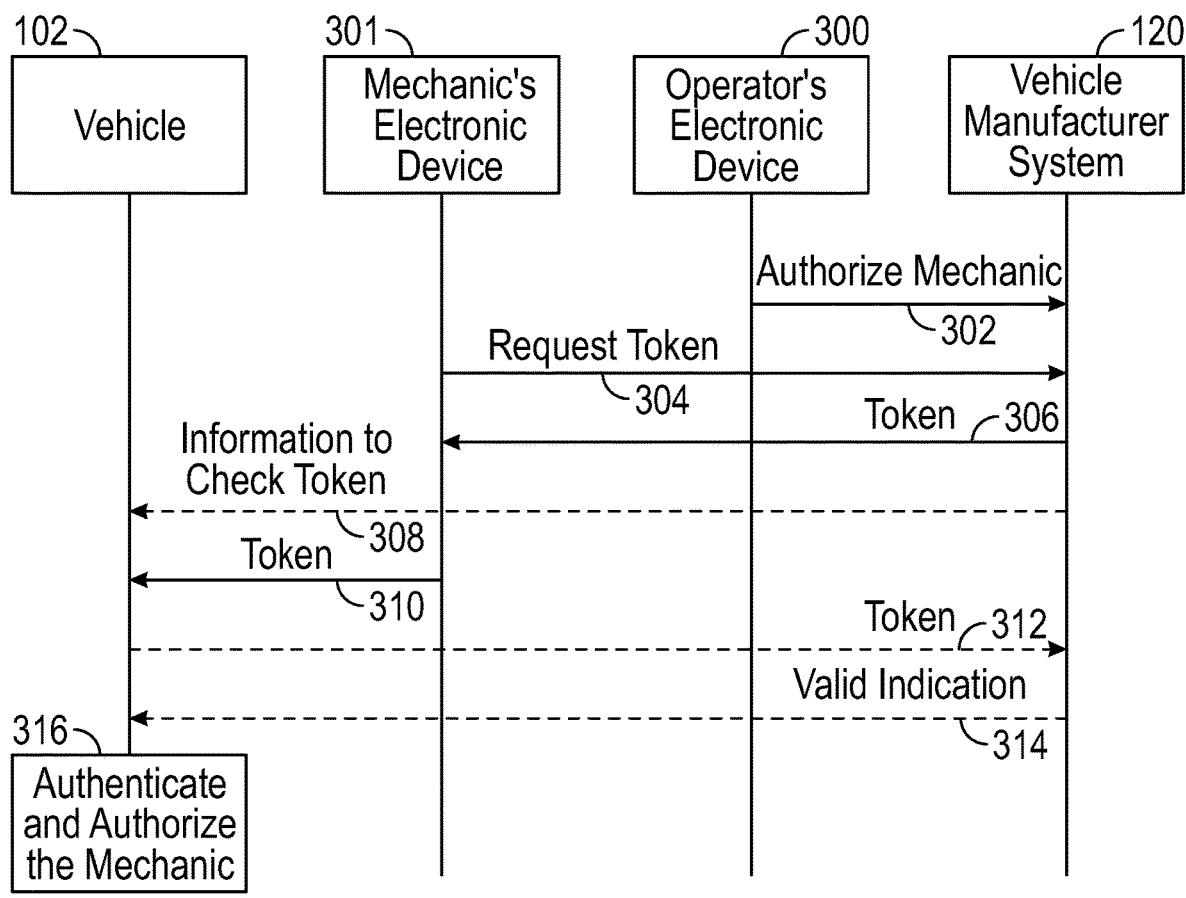
FIGS. 3-9 are message flow diagrams of example processes, in accordance of some implementations of the present disclosure.

FIG. 3 shows a first example signaling flow. The tasks of FIG. 3 can be performed in an order different from that depicted.

The operator 116 (or more specifically, an electronic device 300 associated with the operator 116), authorizes (at 302) a particular mechanic to perform an automotive service, by sending authorization information (e.g., an authorization token) to the vehicle manufacturer system 120. This authorization is part of grant 1 discussed above. The electronic device 300 can be the handheld electronic device 118 of FIG. 1, or another electronic device.

For the vehicle 102 to accept changes from the mechanic 110, at least two things have to happen. First, the mechanic 110 (using an electronic device 301 associated with the mechanic 110) has to be authenticated and authorized by the vehicle manufacturer system 120. The electronic device 301 can be the handheld electronic device 110 of FIG. 1, or another electronic device. This authentication and authorization is based on the mechanic's electronic device 301 sending (at 304) a request for an authentication token from the vehicle manufacturer system 120, and in response, the vehicle manufacturer system 120 sending (at 306) the authentication token to the mechanic's electronic device 301 (grant 2).

In the signaling flow of FIG. 3, the vehicle manufacturer system 120 can optionally send (at 308) information to the vehicle 102 that would enable the vehicle 102 to check the mechanic's authentication token. Task 308 can occur before or after task 306.

Second, the vehicle 102 authenticates the mechanic 110, based on the mechanic's electronic device 301 sending (at 310) the authorization token (which was received by the mechanic's electronic device 301 from the vehicle manufacturer system 120) to the vehicle 102. Task 310 is check 1, implicit, discussed above. The check is implicit because the authorization of the operator 116 is implicit.

In examples where the task 308 is not performed, the vehicle 102 may not have enough information to validate the authorization token (310) from the mechanic's electronic device. As a result, tasks 312 and 314 are performed, in which the vehicle 102 sends (at 312) the authorization token received from the mechanic's electronic device 301 to the vehicle manufacturer system 120. In response, the vehicle manufacturer system 120 sends (at 314) an indication that the authorization token is valid, based on the vehicle manufacturer system 120 confirming that the authorization token is valid.

Once the validity of the authorization token received from the mechanic's electronic device 301 is confirmed (based on the information of task 308 or the indication of task 314), the vehicle 102 authenticates and authorizes (at 316) the mechanic 110 to perform the authorized service.

In some examples, the content of the authorization token from the vehicle manufacturer system 120 (task 306) can include any or some combination of the following: an identifier of the mechanic 110, an identifier of the vehicle 102, an identifier of the automotive service (plus parameters such as a time limit, a list of affected components, a cost estimate, etc.), and a cryptographic signature of the vehicle manufacturer.

Figure 4:
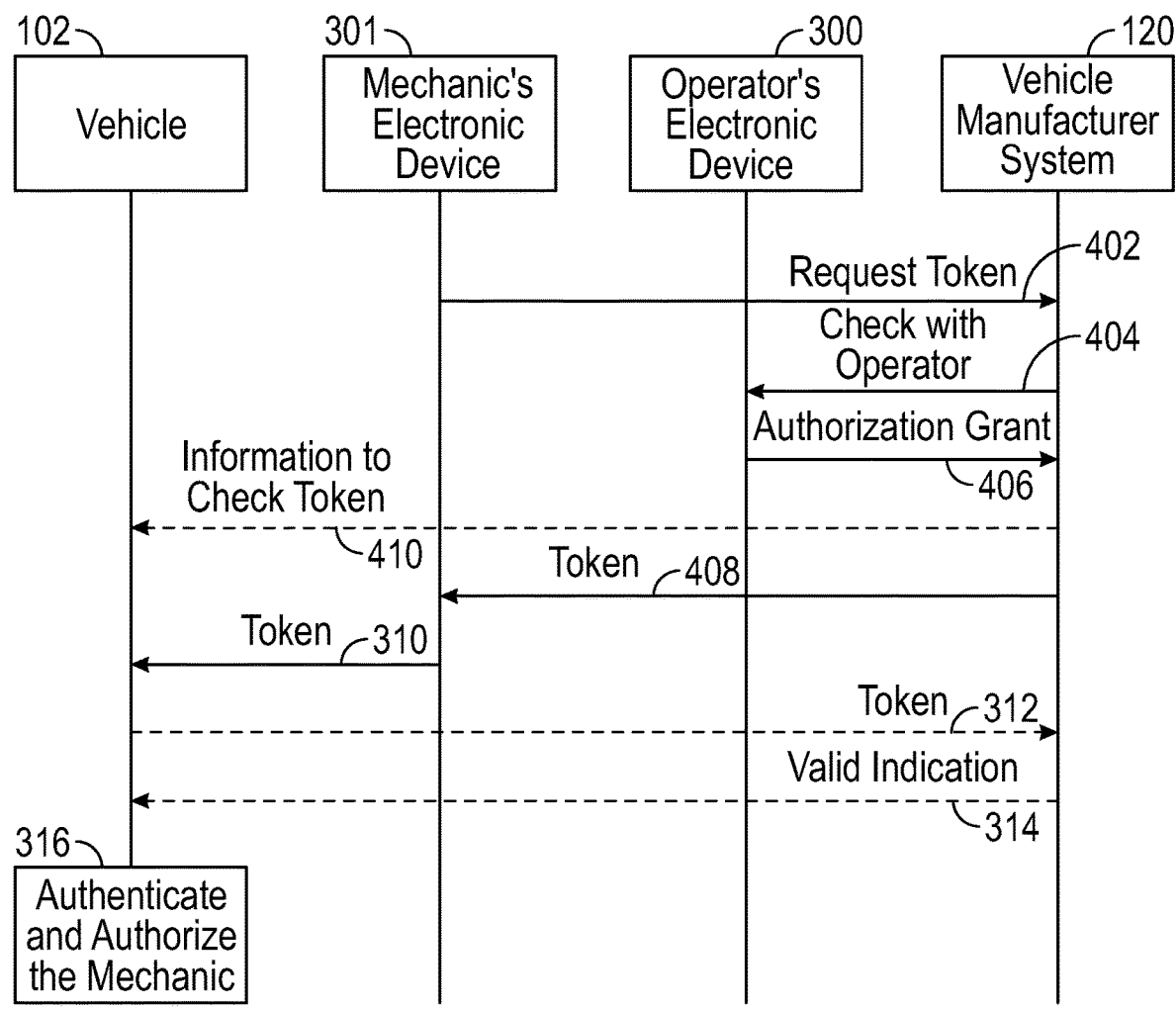

FIG. 4 shows a second example signaling flow. In FIG. 4, the mechanic 110 (instead of the operator 116 as in FIG. 3) initiates the process. The tasks of FIG. 4 can be performed in an order different from that depicted.

The mechanic's electronic device 301 sends (at 402) a request for an authorization token to the vehicle manufacturer system 120. In response to the request, the vehicle manufacturer system 120 checks (at 404) with the operator's electronic device 300 regarding whether the mechanic 110 is authorized for the automotive service. In response to the checking, the operator's electronic device 301 sends (at 406) an authorization grant (possibly including a cryptographic token) to the vehicle manufacturer system 120.

The operator's electronic device 300 can be the operator's smart phone which has an appropriate application installed, or can be the vehicle's telematics control unit, by which the operator 116 can provide authorization via, e.g., username/password access on the infotainment GUI.

In response to receiving the authorization grant, the vehicle manufacturer system 120 sends (at 408) an authorization token to the mechanic's electronic device 301. Optionally, the vehicle manufacturer system 120 can send (at 410) information to the vehicle 102 that enables the vehicle 102 to check the mechanic's authorization token. Tasks 408 and 410 can occur in any order.

The remaining tasks of FIG. 4 are the same as the corresponding tasks of FIG. 3, and are assigned the same reference numerals.

The content of the authorization token sent to the mechanic 110 can be the same as the content of FIG. 3.

Figure 5:
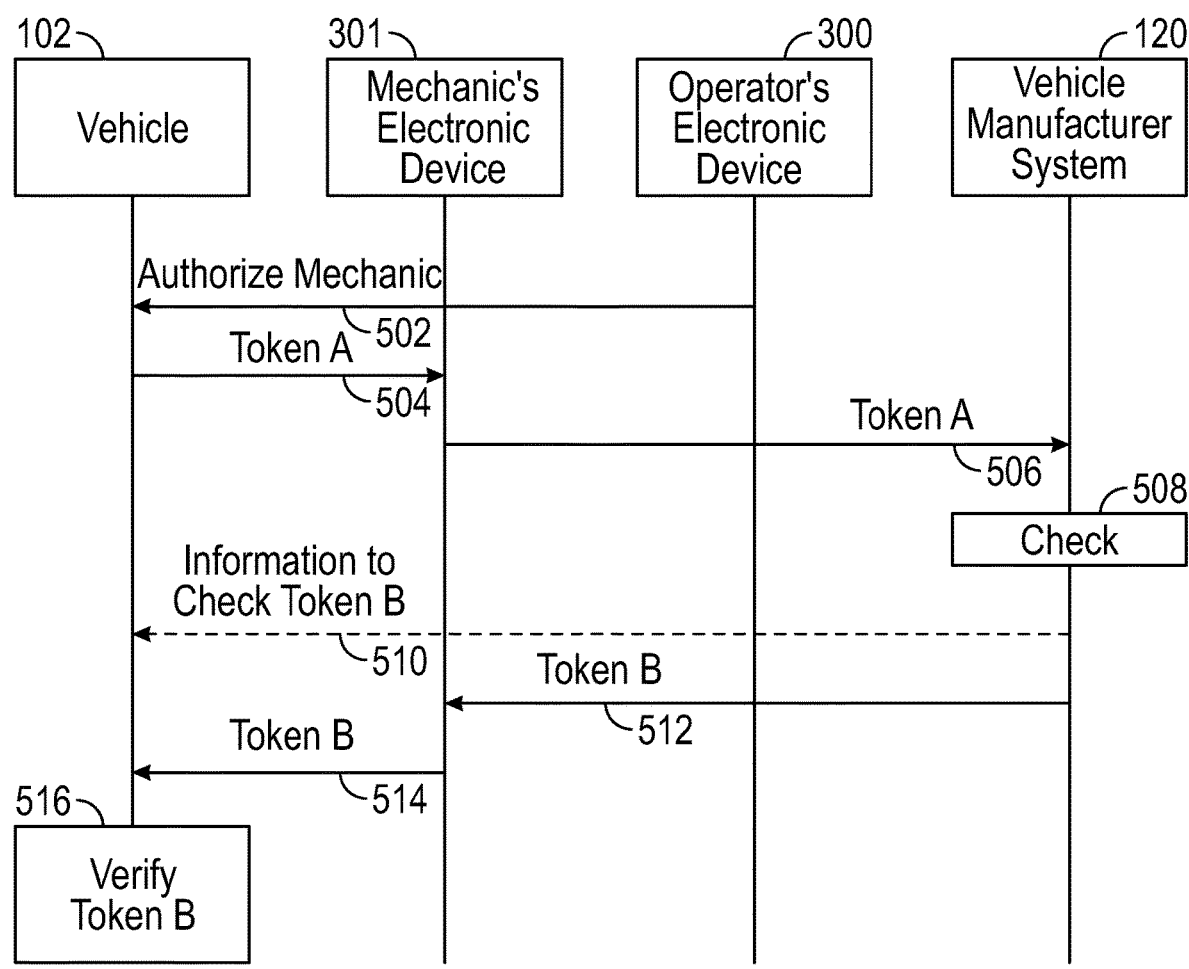

FIG. 5 shows a third example signaling flow. The tasks of FIG. 5 can be performed in an order different from that depicted.

In FIG. 5, the operator 116 uses the vehicle 102 as a device and the mechanic 110 uses the mechanic's electronic device. The vehicle and the mechanic's electronic device can communicate directly via Bluetooth, WI-FI, OBD-II, etc., or via the cloud (implemented the vehicle manufacturer system 120).

The operator 116 (using the operator's electronic device 300 or a device of the vehicle 102) can authorize (at 502) the mechanic 110 to perform the automotive service, by sending authorization information to the vehicle 102.

In response to the authorization information from the operator 116, the vehicle 102 sends (at 504) to the mechanic's electronic device 301 a first authorization token (Token A).

The mechanic's electronic device 301 passes (at 506) Token A to the vehicle manufacturer system 120. The vehicle manufacturer system 120 checks (at 508) Token A and performs other checks too. Optionally, the vehicle manufacturer system 120 can provide (at 510) information to the vehicle 102 to enable the vehicle 102 to check the mechanic's Token B at a later time.

In response to the check (at 508) passing, the vehicle manufacturer system 120 sends (at 512) a new authorization token (Token B) to the mechanic's electronic device 301. The mechanic's electronic device 301 then sends (at 514) Token B to the vehicle 102.

The vehicle 102 verifies (at 516) Token B, which means that the mechanic 110 was authorized by the vehicle manufacturer system 120 as well. The authorization parameters of the vehicle manufacturer system 120 match authorization parameters received from the operator's electronic device 300 as received in task 502.

The content of Token A that the vehicle 102 can provide to the mechanic 110 (task 504) can include any or some combination of the following: an identifier of the mechanic 110, an identifier of the operator 116, an identifier of the vehicle 102, an identifier of the automotive service (plus parameters like time limit, affected components, cost estimate, etc.), and a cryptographic signature of the vehicle 102.

The content of Token B is the same as the authorization token of FIG. 3.

Figure 6:
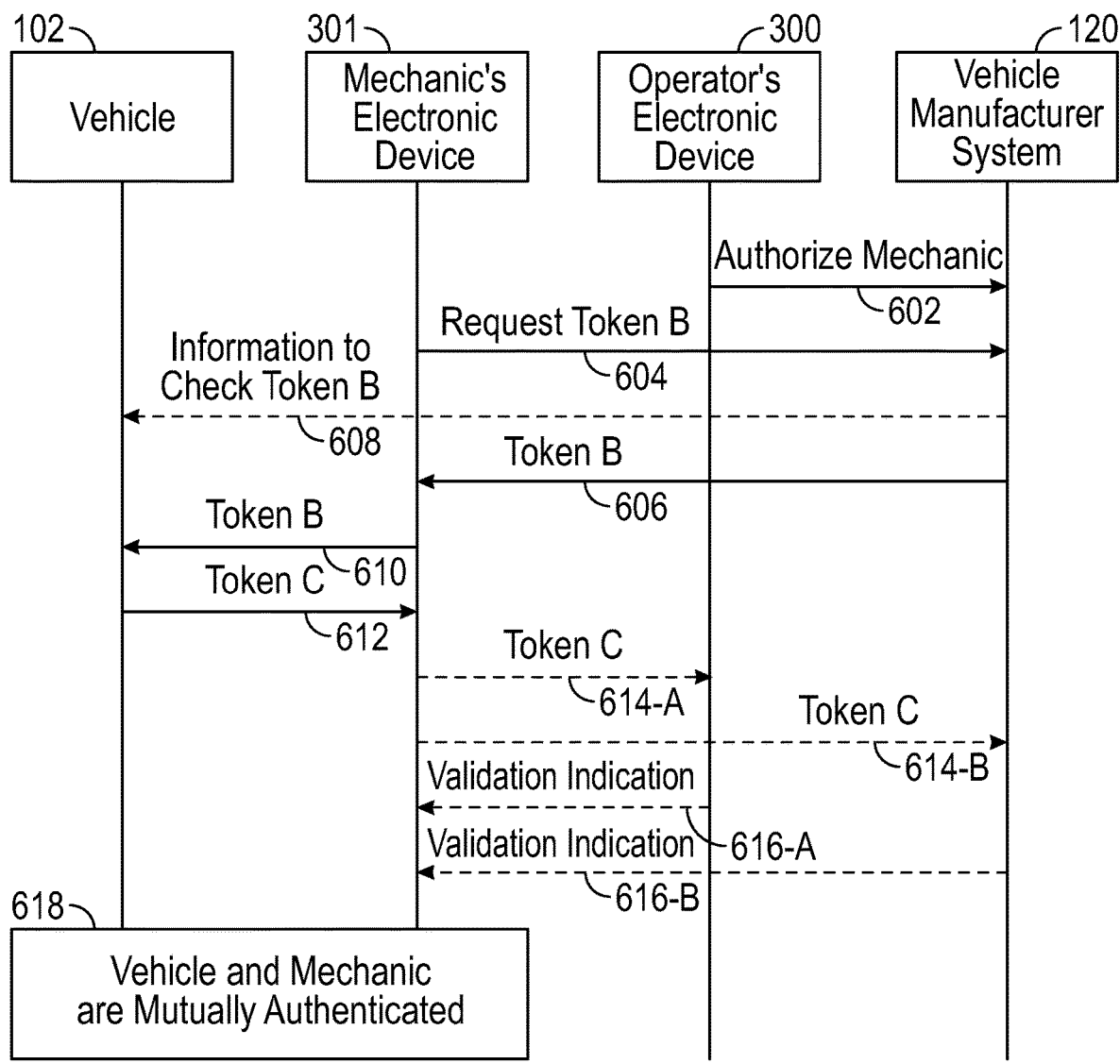

FIG. 6 shows a fourth example signaling flow. The tasks of FIG. 6 can be performed in an order different from that depicted.

The operator's electronic device 300 authorizes (at 602) a particular mechanic to perform an automotive service, by sending authorization information to the vehicle manufacturer system 120.

The mechanic's electronic device 301 sends (at 604) a request for an authentication token (Token B) from the vehicle manufacturer system 120. In response, the vehicle manufacturer system 120 sends (at 606) Token B to the mechanic's electronic device 301.

In the signaling flow of FIG. 6, the vehicle manufacturer system 120 can optionally send (at 608) information to the vehicle 102 that would enable the vehicle 102 to check the mechanic's authentication token. Task 608 can occur before or after task 606.

The vehicle 102 authenticates the mechanic 110, based on the mechanic's electronic device 301 sending (at 310) Token B (which was received by the mechanic's electronic device 301 from the vehicle manufacturer system 120) to the vehicle 102.

Next, the vehicle 102 sends (at 612) an authorization token (Token C) to the mechanic's electronic device 301, to enable the mechanic's electronic device 301 to authenticate the vehicle 102. Optionally, in response, the mechanic's electronic device sends (at 614-A) Token C to the operator's electronic device 300 (directly or via the cloud), or alternatively, the mechanic's electronic device sends (at 614-B) Token C to the vehicle manufacturer system 120.

Responsive to the operator's electronic device 300 or the vehicle manufacturer system 120 validating Token C, the operator's electronic device 300 or the vehicle manufacturer system 120 sends (at 616-A or 616-B, respectively) an indication of the validation of Token C back to the mechanic's electronic device 301.

At this point, the vehicle 102 and the mechanic 110 are mutually authenticated (at 618). Note that the operator 116 and the vehicle manufacturer may have implicitly provided the authentication.

The content of Token C can include any or some combination of the following: an identifier of the vehicle 102, information of a type of automotive service, a list of affected vehicle components, a time limit, an estimated cost, and a cryptographic signature of the vehicle 102.

3.5 Standards Impact: OAuth 2.0 and UGP 3.5.1 the OAuth 2.0 Mapping

Table 1 below provides a mapping of entities shown in FIGS. 1 and 3-6 and entities of OAuth 2.0.

TABLE 1

| Automotive entities | OAuth 2.0 entities | Notes |
|---|---|---|
| Vehicle | Resource server | The resource provided is access to internal components of the vehicle to perform diagnostics and/or repair |
| Mechanic's electronic device | Client | For cases when the mechanic initiates transactions |
| Operator | Resource Owner | |
| Vehicle manufacturer system | Authorization Server | |
| Operator authorizes mechanic to do certain service directly. Grant 1. | Authorization Request and Grant | |
| Mechanic requests token from the vehicle manufacturer cloud based on owner authorization token. The cloud gives access token (Grant 2) | Authorization Grant and Access Token provided by Authorization Server | |
| Mechanic provides token to car (Check 1), gets access to vehicle | Access Token and Access to protected resource | |

Figure 7:
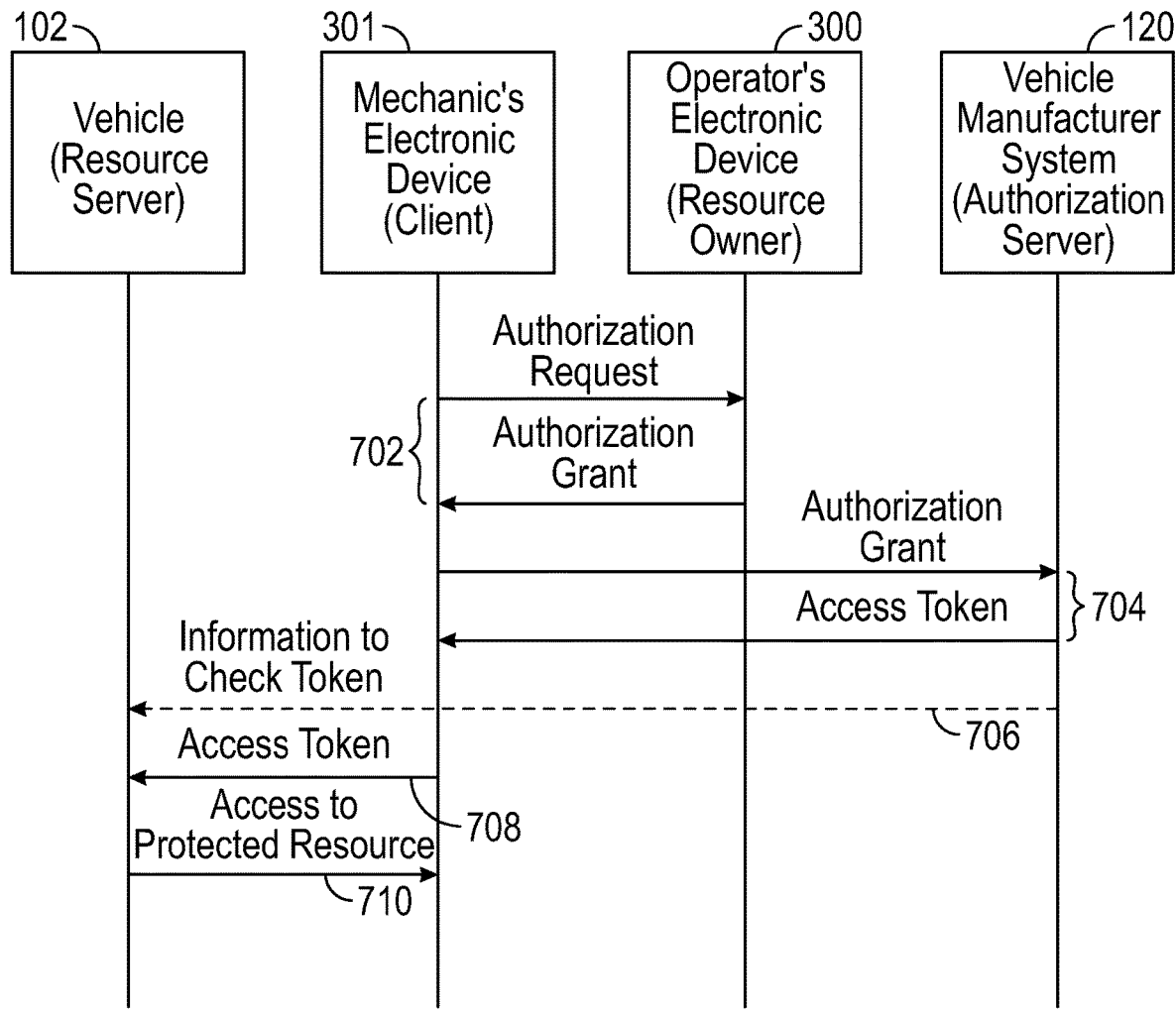

FIG. 7 shows an example signaling flow in which OAuth 2.0 messages are used. The tasks of FIG. 7 can be performed in an order different from that depicted.

A message flow 702 including an authorization request and authorization grant allows an operator 116 to authorize the mechanic 110 directly.

A message flow 704 can be used by the mechanic 110 to request a token from the vehicle manufacturer system 120, and for the vehicle manufacturer system 120 to send the token to the mechanic 110.

The vehicle manufacturer system 120 can provide (at 706) an access token (including an authorization token) to the vehicle 102. The mechanic's electronic device can send (at 708) an access token (including an authorization token) to the vehicle 102. The vehicle 102 can send (at 710) an access token to the mechanic's electronic device to access a protected resource.

OAuth 2.0 can be modified to include the following features.

An Authorization grant (as a JSON Web token (TBC)) can be expanded to include vehicle service parameters: a diagnostic code, a service code, an expiration time, a list of affected vehicle components, an identifier of a mechanic, an identifier of a vehicle.

A transaction from an Authorization server (vehicle manufacturer cloud) to a resource server (vehicle) can be added to enable the checking of the token (by the vehicle). An issue may be that the vehicle is the resource server, but the vehicle may not have any prior ability to check authorization tokens like in OAuth 2.0. This transaction (between authorization server and resource) is present in another, separate token system: STS (Security Token Service).

3.5.2 Modification of UGP

As noted above, Unified Gateway Protocol (UGP) is a protocol between a diagnostic tool and the gateway ECU in a vehicle.

The security signaling part of UGP can be modified to accommodate the authorization of the operator 116. In the current UGP standard there is an authenticationCall UGP message containing a string called authenticationKey. This message is sent from the diagnostic tool device to the gateway (VSG) of the car. In response, the VSG responds with an authenticationReply UGP message containing a binary "authorization" token value where each bit corresponds to a certain privilege, e.g., bit 0 means get-value-extended-access, bit 4 means file-download-access, and these bits could be set but other bits could be set to 0. If the authenticationKey is found not suitable, then the VSG sends a negative authenticationReply granting no access.

To enhance UGP, the authenticationCall message is modified to include in addition to or in lieu of the authenticationKey at least one security token, as in the example flows that show a token being sent to the vehicle 102. In some examples, this token is cryptographically signed by the vehicle manufacturer. The data in the token can contain any or some combination of the following:
  identifier of a mechanic;
  identifier of a vehicle;
  identifier of a service, plus parameters like time limit, cost estimate, a list of identifiers of affected vehicle components, etc.;
  Cryptographic signature of the vehicle manufacturer.

The VSG can take this security token into account (e.g., at least verifying the signature of the vehicle manufacturer and the identifier of the mechanic in the authenticationKey original part, assuming token contains the identifier of the mechanic) when determining an authorization value.

4. Encoding of Authorization Conditions

Constraints on a requested or granted authorization can be provided by the operator 116 or the mechanic 110 as part of the authorization process.

4.1 Constraints Specified by the Operator

In some examples, the operator 116 may only grant authorization for certain specific automotive service(s) to be performed on the vehicle 102, whereas the list of recommended services by the vehicle manufacturer may contain several services, as superset of those selected services.

For example, if the operator 116 has authorized that an automotive service can be performed on the brakes, then automotive services on other components of the vehicle 102 will not be permitted.

The operator 116 can grant authorization for only a period of time, e.g., from the present until 2 weeks from now. Then any repairs attempted outside this time window should be rejected by the vehicle 102.

The operator 116 can authorize whether repair or replacement of only software, only hardware (ECU), or some combination of hardware and software is allowed, and the vehicle 102 could enforce this restriction. In the case of hardware repair or replacement, a technique of enforcement can involve providing a notification to the operator 116 that hardware has been changed in the vehicle 102 (in violation of an authorization), and/or not allowing the vehicle 102 to start when unauthorized new hardware has been inserted. In the case of software repair or replacement, the vehicle 102 can ensure that only authorized updates may be made. Additionally, the vehicle 102 may provide a notification to the operator 116 that software has been changed (in violation of an authorization).

Authorization information specifying constraints may also include an agreed maximum price for the automotive service. In this way, the authorization/authentication signaling also establishes a contract between the mechanic 110 and the operator 116, which may be accessed in case of a later dispute between the mechanic 110 and the operator 116. Optionally, only the vehicle manufacturer can see this maximum price.

Also, optionally, the process may be repeated if the mechanic 110 finds that the repairs are more extensive than anticipated, and so a new authorization has to be granted via a similar mechanism.

The following describes examples of data formats that can be used for specifying an authorization of an automotive service.

The authorization data can be included in a digital file that is cryptographically signed by the operator 116 via a device (e.g., a smart phone) or can be provided to the mechanic 110 and/or the vehicle manufacturer via a secure communication channel.

An example implementation is as follows. The mechanic 110 can present a cost estimate to the operator 116, which states, for example, that brakes are going to be fixed and it will cost $100. This cost estimate is communicated to the operator 116, which provides an authorization for this work to commence. The cost estimate can be put together using an application, such as based on use of drop down menus and so forth to enable mechanic 110 to describe work that is to be performed. A first version of cost estimate and information of the work to be performed may be produced automatically by the vehicle manufacturer system 120 (such as based on remote diagnostics monitoring). The mechanic 110 can edit the cost estimate and information describing the work, and can pass the information to the operator 116. The operator 116 can view the information, which can be presented by an application on an electronic device of the operator 116. The operator 116 can agree to the information, such as by clicking on an "agree" button presented by the application. The application then produces a file (e.g., an eXtensible Markup Language (XML) file or other type of file) describing the work that is to be performed, and then cryptographically signs this authorization file using a private key of the operator 116.

4.2 Constraints Specified by the Mechanic

The mechanic 110 may only request authorization for certain specific work to be performed. In a similar way to that described above for the operator 116, the mechanic 110 may encode information of the work that the mechanic 110 is planning to perform, and the mechanic 110 may include a price for the job, a maximum timeframe that is expected for the job, and so forth. This file is cryptographically signed by the mechanic 110 via a device associated with the mechanic 110. The cryptographically signed file can be provided to the operator 116 and/or the vehicle manufacturer.

The vehicle manufacturer system 120 can perform the role of checking that authorization requests and grants (in authorization files) are consistent with one another, or alternatively the authorization files can be directly shared between the operator 116 and the mechanic 110.

In the context of OAuth 2.0, these permissions are referred to as "scope." In the Internet context, the scope contains space-delimited permissions that the application seeking authorization requires. In the automotive case as per current disclosure, the scope can contain elements of the service, e.g., service type (oil change, etc.), identifier of the mechanic (optional, can be part of client ID), a time window, and optionally, other parameters like affected vehicle components, cost.

5. Validation that Work Completed Corresponds to Work Authorized

Signaling flows can be organized such that the vehicle manufacturer performs a central role in which the vehicle manufacturer has visibility of the requested and granted authorizations. The vehicle manufacturer also receives diagnostics information directly from the vehicle 102 after the work has been completed. The vehicle manufacturer may therefore be able to determine whether the agreed work has actually been done, and if so, whether the work has been done adequately.

For example, if the mechanic 110 was authorized to change oil then the vehicle manufacturer may expect to see a change in the oil level being reported by the vehicle 102 (if the vehicle 102 is able to do a reading at the instance that the oil is drained out; though perhaps this is only possible if oil levels were lower than desirable prior to the visit to the repair facility).

Figure 8:
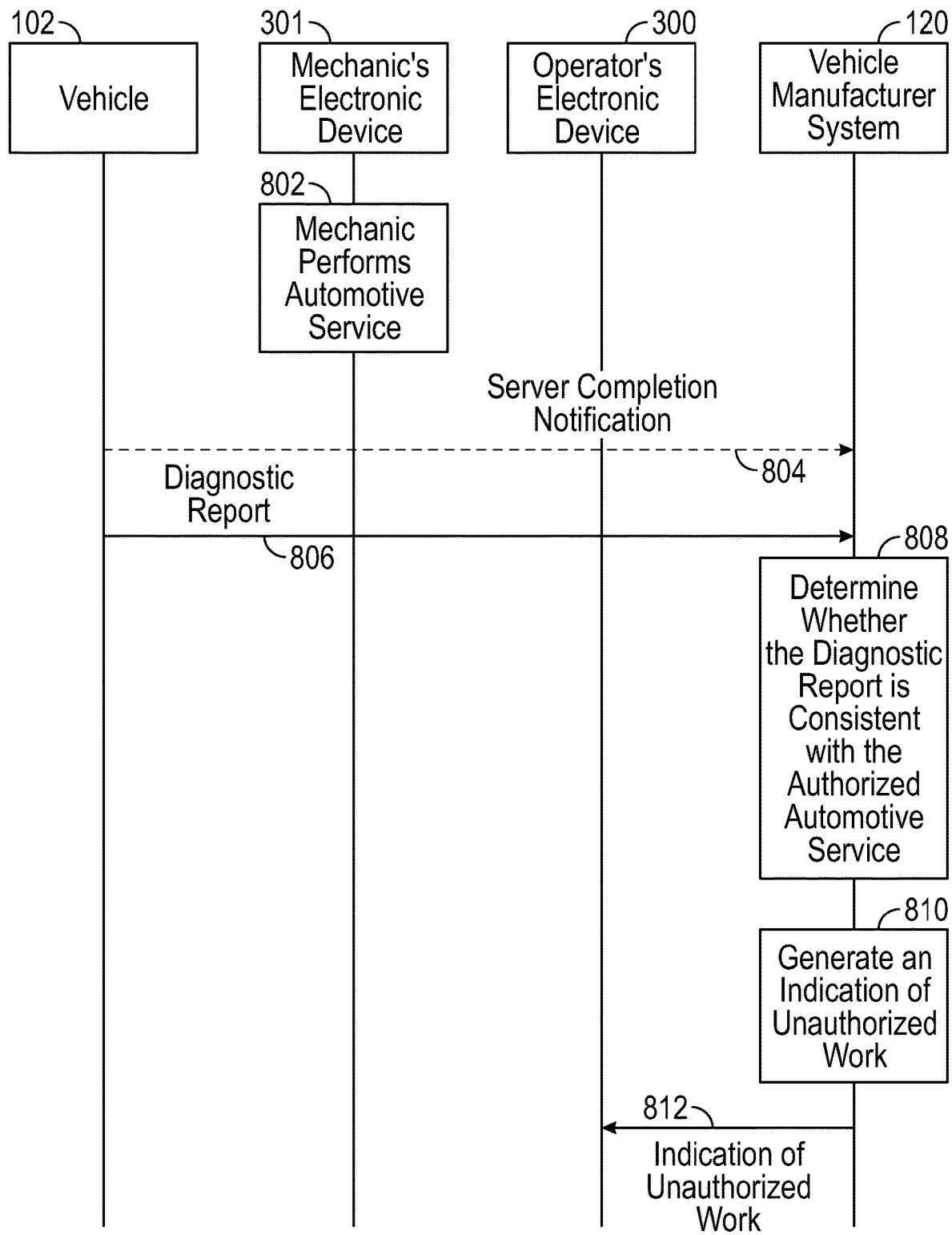

FIG. 8 shows an example signaling flow after the mechanic 110 has performed (at 802) the automotive service. The tasks of FIG. 8 can be performed in an order different from that depicted.

Note that the authorization for the automotive service may have been confirmed by the vehicle 102 using any of the signaling flows of FIGS. 3-6, for example.

The mechanic's electronic device, the operator's electronic device, or the vehicle 102 can notify (at 804) the vehicle manufacturer system 120 that the automotive service has been completed. The vehicle 102 sends (at 806) a diagnostic report to the vehicle manufacturer system 120.

The vehicle manufacturer system 120 determines (at 808) whether the information in the diagnostic report is consistent with the authorized automotive service. If not, then the vehicle manufacturer system 120 can generate (at 810) an indication that unauthorized work may have been performed. For example, the vehicle manufacturer system 120 may set a risk factor to a value indicating an elevated level of risk.

The vehicle manufacturer system 120 can send (at 812) the indication to the operator's electronic device 300, to alert the operator 116 of the possible risk of an unauthorized service.

6. Use of QR Codes or NFC/BT Communication to Achieve Authorization for Vehicle Diagnostic/Repair The operator 116 wishes to allow the repair facility 104 to perform an automotive service on the vehicle 102. The vehicle 102 is designed to ensure that only authorized repairs (as authorized by the vehicle manufacturer and the operator 116) are performed, and optionally, only via certain diagnostic tools (identified by, for example, type/model numbers, or by owner, i.e., ones belonging to certain dealers/shops).

The only entity that the vehicle 102 trusts is the vehicle manufacturer. The vehicle manufacturer system 120 has secure links to vehicles, and the secure links are used to upload/download vehicle data. It is assumed the vehicle manufacturer knows about all acceptable/recommended repairs at a given time for a given vehicle.

The vehicle 102 ensures before granting access (e.g., open the OBD-II port), that the repair entity is authorized by the operator 116 for a given automotive service, and/or the repair entity has been authorized by the vehicle manufacturer as well (e.g., the repair entity is an authorized dealer).

One way the vehicle 102 can ensure the legitimacy of the repair entity and the authorization granted by the operator 116 is by gathering both identifying information from the mechanic's electronic device (implicitly as a request to perform service) and identifying information from the operator's electronic device (as an authorization grant) at substantially the same time and via short-range communication. This ensures that at least both the mechanic's electronic device and the operator's electronic device are in proximity to the vehicle 102 at the same time.

There are many options for short-range communications: QR codes, NFC tags/signals, Bluetooth or Bluetooth Low-Energy signals, and WI-FI or WI-FI-Direct signals.

The vehicle 102 then sends both the identifying information from the mechanic's electronic device and identifying information from the operator's electronic device up to the vehicle manufacturer system 120 to be verified. This is because the vehicle 102 may not have all the information to verify the information and make an authorization decision. Alternatively, the vehicle 102 is provided by the vehicle manufacturer a list of approved repair entities for given types of service/repairs, so that the vehicle 102 can make that decision on its own.

The vehicle manufacturer system 120 can send back to the vehicle 102 a list of access privileges that the vehicle 102 can grant to the mechanic's electronic device for the automotive service. The vehicle manufacturer system 120 can send back any or all of the following types of information: information identifying a diagnostic tool (e.g., model/serial number, and/or shop identifier), a list of ECUs that are allowed to be updated (repaired, replaced, or from which data can be obtained), a list of acceptable Parameter IDs (PIDs), which are codes used to request data from a vehicle via a diagnostic tool.

The vehicle 102 then opens the diagnostics port for the repair entity to access. A component of the vehicle such as vehicle controller 106 or the electronic component 108, can restrict access to only certain components in the vehicle; access restriction can be implemented via a gateway or firewall. The vehicle 102 sends a diagnostic report to the vehicle manufacturer system 120.

Figure 9:
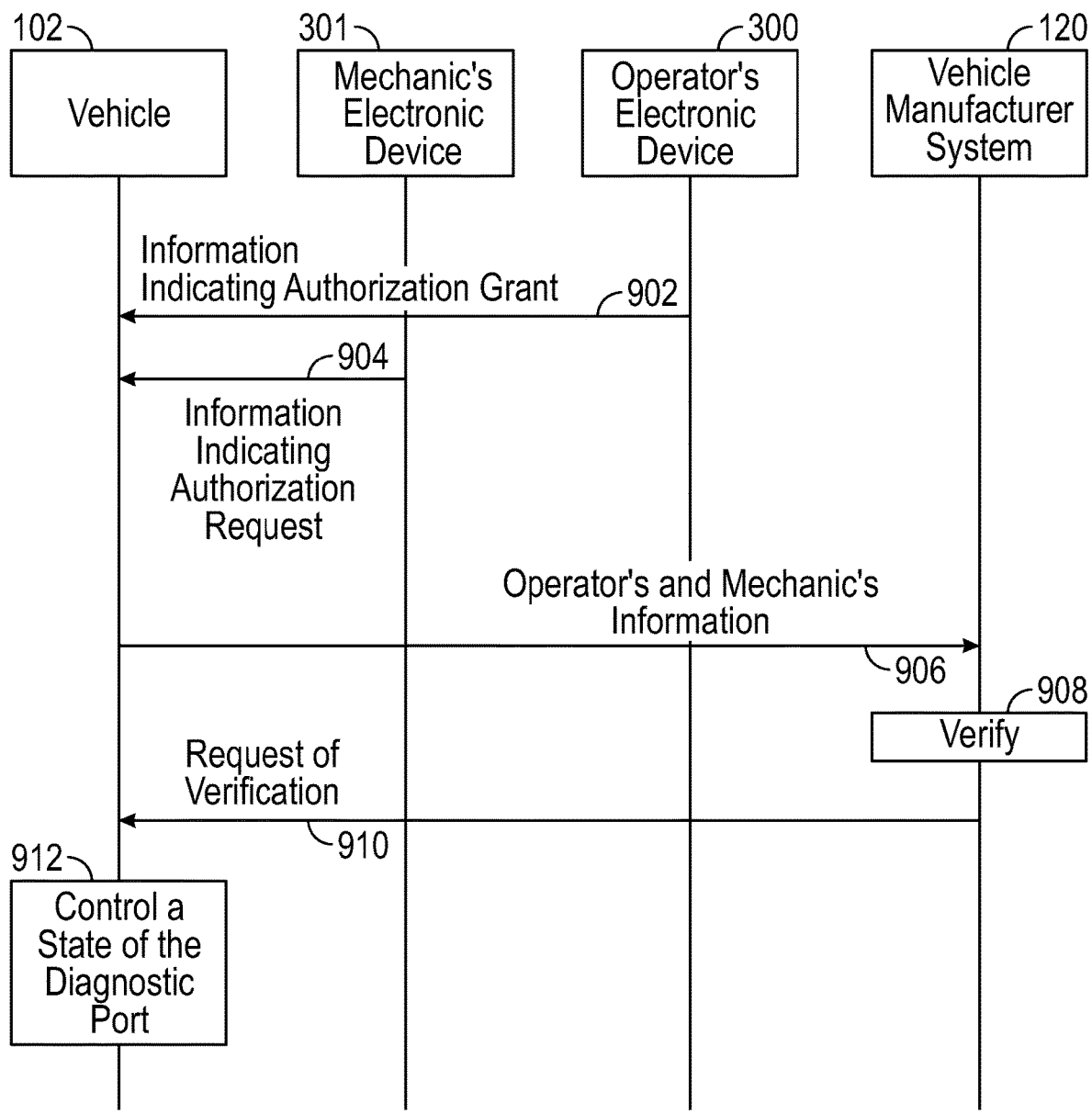

FIG. 9 shows an example signaling flow. The tasks of FIG. 9 can be performed in an order different from that depicted.

The operator's electronic device 300 sends (at 902) to the vehicle 102 information indicating an authorization grant using a short-range communication, such as by use of a QR code, an NFC tag, a Bluetooth Low Energy beacon, etc.

The mechanic's electronic device 301 sends (at 904) to the vehicle 102 information indicating an authorization request using a short-range communication (e.g., any of the above short-range communications). The information can also include identifying information of the mechanic's electronic device.

The vehicle 102 sends (at 906) both the operator's and mechanic's information (which can be different from each other, e.g. both QR codes or one QR code, one NFC tag) to the vehicle manufacturer system 120.

The vehicle manufacturer system 120 verifies (at 908) the operator's and mechanic's information, and sends (at 910) a result of the verification to the vehicle 102. The result can be a positive result, which means the automotive service is approved to proceed, or a negative result, which means that the vehicle 102 should not allow the automotive service at this time, location, and/or from this mechanic.

In response to the result, the vehicle 102 controls (at 912) a state of the diagnostic port of the vehicle 102. For example, in response to a positive result, the vehicle 102 opens the diagnostic port. In response to a negative result, the vehicle 102 maintains diagnostics port closed.

The following discusses how the operator's electronic device operates, such as for task 902 in FIG. 9. It is assumed that the vehicle 102 is ready to receive the information from the operator's electronic device (e.g., the vehicle's camera is ready, or the NFC reader in the vehicle 102 is ready, or the Bluetooth or WI-FI connection to the operator's electronic device is ready). The operator 116 opens an application on the operator's electronic device. The application may be an application developed by the vehicle manufacturer, or an application developed by a repair facility. The operator 116 selects, in a GUI of the application, an automotive service from a drop-down menu or accepts a suggestion (in case of the vehicle manufacturer application, the vehicle manufacturer may have already suggested services and/or repairs). The operator's electronic device then displays a QR code, or notifies that an NFC tag is ready to be read, or that a Bluetooth code is ready to be sent, or that the WI-FI connection to the vehicle 102 is ready. The operator 116 then points the operator's electronic device toward the vehicle 102, and the vehicle 102 reads the QR code, or the NFC tag, or receives a Bluetooth or Bluetooth Low Energy beacon or a WI-FI signal, all via a short range communication.

The mechanic's electronic device can perform similar tasks for task 904 of FIG. 9.

In another example, the QR code appears in a display (e.g., head up display), and the operator's electronic device reads the QR code. The operator's electronic device can redirect the QR code or a link (e.g., a uniform resource locator (URL) relating to the QR code) to the vehicle manufacturer system 120. The URL relating to the QR code contains a cookie or other authorization information, by which the vehicle manufacturer system 120 can deduce that the operator 116 is in the proximity of the vehicle, and the vehicle manufacturer system 120 can authorize the automotive service to be performed on the vehicle 102.

Similarly, another or the same QR code can appear on the display of the vehicle 102, and the mechanic's electronic device can read the QR code. The mechanic's electronic device can redirect the QR code (or a link in the form of a URL to the QR code) to the vehicle manufacturer system 120. The URL contains a cookie or other authorization information, by which the vehicle manufacturer system 120 can deduce that the mechanic 110 is also in the proximity of the vehicle 102. In the end, the vehicle manufacturer instructs the vehicle 102 to allow limited access to the mechanic's diagnostic tool. In some examples, the vehicle manufacturer sends a list of PIDs that the OBD-II diagnostic port can accept.

7. System Architecture

Figure 10:
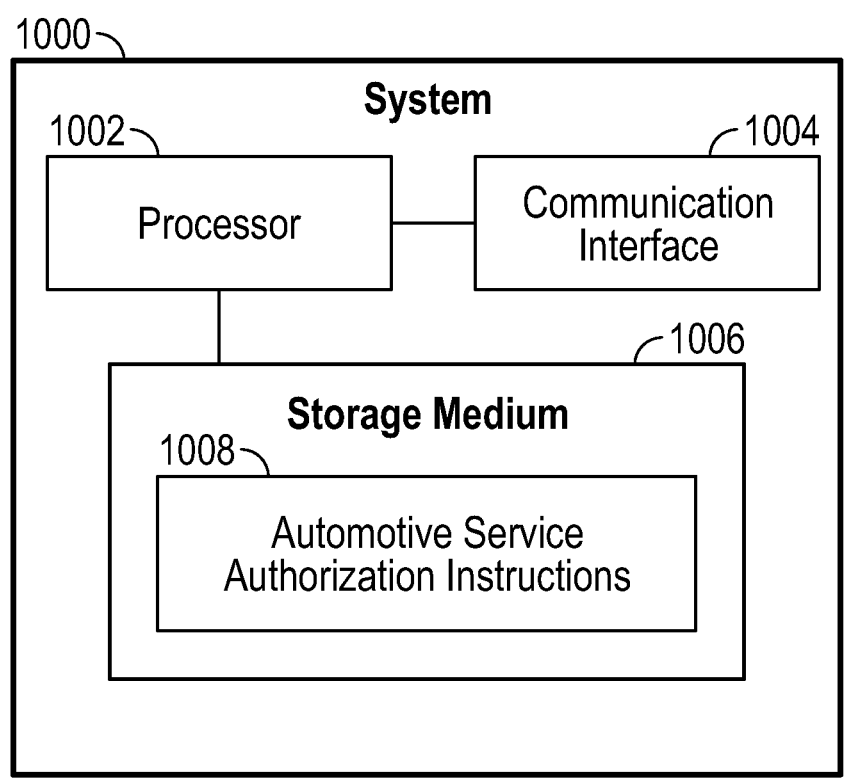
FIG. 10 is a block diagram of a system according to some implementations of the present disclosure.

FIG. 10 is a block diagram of an example system 1000, which can be any of the vehicle controller 106, the devices 112, 118, 300, and 301, the repair facility computer 114, and the vehicle manufacturer system 120.

The system 1000 includes one or more hardware processors 1002. A hardware processor can include a microprocessor, a core of a multi-core microprocessor, a microcontroller, a programmable integrated circuit, a programmable gate array, a digital signal processor, or another hardware processing circuit.

The system 1000 includes a communication interface 1004 to communicate over a network, such as a wireless network or a wired network. The communication interface 1004 includes a transceiver to transmit and receive signals over the network, and one or more protocol layers that control the transmission and reception of the messages or frames according to corresponding one or more protocols.

The system 1000 includes a non-transitory machine-readable or computer-readable storage medium 1006 to store machine-readable instructions that are executable on the one or more hardware processors 1002 can perform any of various tasks discussed above. The machine-readable instructions can include automotive service authorization instructions 1008 to perform authorizations for supporting automotive services on vehicles.

The storage medium 1006 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   receiving, by a vehicle comprising a diagnostic port, authorization information that identifies an automotive service to be performed on the vehicle, the authorization information further indicating approval of performance of the automotive service on the vehicle by an operator of the vehicle and a vehicle manufacturer, wherein the authorization information received by the vehicle comprises vehicle manufacturer authorization information sent by a computer of the vehicle manufacturer over a network to the vehicle responsive to the computer of the vehicle manufacturer receiving an indication that the vehicle manufacturer authorization information is requested, and wherein the vehicle manufacturer authorization information received by the vehicle over the network from the computer of the vehicle manufacturer identifies an authorized repair entity approved to perform the automotive service, the authorized repair entity different from the operator of the vehicle;
   receiving, by the vehicle, configuration information from the computer of the vehicle manufacturer, the configuration information providing selective access to a portion of the vehicle for the automotive service while disabling access to another portion of the vehicle;
   based on the authorization information received by the vehicle and the configuration information received by the vehicle from the computer of the vehicle manufacturer, opening, by the vehicle, the diagnostic port that was closed to accept access from an external device of the authorized repair entity to perform the automotive service, wherein the opening of the diagnostic port of the vehicle to accept access from the external device is responsive to verifying that a repair entity attempting to perform the automotive service is the authorized repair entity identified by the vehicle manufacturer authorization information received by the vehicle over the network from the computer of the vehicle manufacturer, and the diagnostic port is opened responsive to a setting from the computer of the vehicle manufacturer; and
   after the opening of the diagnostic port, performing, at the vehicle, diagnostic tests through the opened diagnostic port and communicating, by an electronic component of the vehicle, with the external device through the opened diagnostic port.

2. The method of claim 1, wherein the authorization information received by the vehicle indicates a time interval during which the approval of the performance of the automotive service is valid.

3. The method of claim 1, wherein the setting from the computer of the vehicle manufacturer comprises a firewall setting.

4. The method of claim 1, wherein the setting from the computer of the vehicle manufacturer comprises a list of Electronic Control Unit (ECU) identifiers of ECUs of the vehicle to which access is allowed.

5. The method of claim 1, wherein the opening of the diagnostic port to accept access from the external device is further based on detecting, by the vehicle, that the vehicle is within a specified proximity of at least one of the operator of the vehicle or the authorized repair entity.

6. The method of claim 1, wherein the opening of the diagnostic port is responsive to a credential or key received from the external device of the authorized repair entity.

7. The method of claim 1, wherein the receiving of the authorization information comprises receiving, by the vehicle from the operator using a short-range communication, information identifying and/or authorizing the automotive service, the method further comprising:
   receiving, by the vehicle from the authorized repair entity using a short-range communication, identification information of the authorized repair entity,
   wherein the opening of the diagnostic port to accept access from the external device is further based on the identification information of the authorized repair entity.

8. The method of claim 7, further comprising:
   sending, by the vehicle to the computer of the vehicle manufacturer, information identifying the automotive service and the identification information of the authorized repair entity.

9. The method of claim 1, wherein the opening of the diagnostic port to accept access from the external device is based on the vehicle receiving, from the external device of the authorized repair entity, a security token provided by the vehicle manufacturer to the authorized repair entity.

10. The method of claim 1, wherein the opening of the diagnostic port to accept access from the external device is further based on the vehicle authenticating the authorized repair entity.

11. The method of claim 10, wherein the authenticating of the authorized repair entity is based on authentication information obtained by the authorized repair entity from the computer of the vehicle manufacturer.

12. The method of claim 1, further comprising:
   in response to an indication of completion of the automotive service, sending, by the vehicle to the computer of the vehicle manufacturer, information useable by the computer of the vehicle manufacturer to validate that:
      the automotive service was completed by the authorized repair entity on the vehicle, or
      the automotive service performed by the authorized repair entity on the vehicle is the automotive service identified by the authorization information.

13. The method of claim 1, further comprising:
   receiving, by the vehicle, a request from the authorized repair entity to perform a further automotive service on the vehicle; and
   receiving, by the vehicle, an indication of whether or not the operator has approved the further automotive service on the vehicle.

14. The method of claim 13, further comprising:
receiving, by the vehicle, an indication of whether or not the vehicle manufacturer has approved performance of the further automotive service on the vehicle.

15. A non-transitory machine-readable storage medium comprising instructions that upon execution cause a vehicle to:
receive, at the vehicle comprising a diagnostic port, authorization information that identifies an automotive service to be performed on the vehicle, the authorization information further indicating approval of performance of the automotive service on the vehicle by an operator of the vehicle and an entity that defines a scope of the automotive service to be performed on the vehicle, wherein the authorization information received at the vehicle comprises vehicle manufacturer authorization information sent by a computer of a vehicle manufacturer over a network to the vehicle responsive to the computer of the vehicle manufacturer receiving an indication that the vehicle manufacturer authorization information is requested, and wherein the vehicle manufacturer authorization information received by the vehicle over the network from the computer of the vehicle manufacturer identifies an authorized repair entity approved to perform the automotive service, the authorized repair entity different from the operator of the vehicle;
receive, at the vehicle, configuration information from the computer of the vehicle manufacturer, the configuration information providing selective access to a portion of the vehicle for the automotive service while disabling access to another portion of the vehicle;
based on the authorization information received at the vehicle and the configuration information received at the vehicle from the computer of the vehicle manufacturer, open the diagnostic port that was closed to accept access from an external device of the authorized repair entity to perform the automotive service, wherein the opening of the diagnostic port to accept access from the external device is responsive to verifying that a repair entity attempting to perform the automotive service is the authorized repair entity identified by the vehicle manufacturer authorization information received by the vehicle over the network from the computer of the vehicle manufacturer, and the diagnostic port is opened responsive to a setting from the computer of the vehicle manufacturer; and
after the opening of the diagnostic port, perform, at the vehicle, diagnostic tests through the opened diagnostic port and communicate, by an electronic component of the vehicle, with the external device through the opened diagnostic port.

16. The non-transitory machine-readable storage medium of claim 15, wherein the setting from the computer of the vehicle manufacturer comprises a firewall setting.

17. The non-transitory machine-readable storage medium of claim 15, wherein the setting from the computer of the vehicle manufacturer comprises a list of Electron Control Unit (ECU) identifiers of ECUs of the vehicle to which access is allowed.

18. The non-transitory machine-readable storage medium of claim 17, wherein the automotive service comprises a software or firmware patch to be applied to the electronic component.

19. A vehicle comprising:
a diagnostic port;
a processor; and
a non-transitory storage medium storing instructions executable on the processor to:
receive, at the vehicle, authorization information that identifies an automotive service to be performed on the vehicle, the authorization information further indicating approval of performance of the automotive service on the vehicle by an operator of the vehicle and a vehicle manufacturer, wherein the authorization information received by the vehicle comprises vehicle manufacturer authorization information sent by a computer of the vehicle manufacturer over a network to the vehicle responsive to the computer of the vehicle manufacturer receiving an indication that the vehicle manufacturer authorization information is requested, and wherein the vehicle manufacturer authorization information received by the vehicle identifies an authorized repair entity approved to perform the automotive service, the authorized repair entity different from the operator of the vehicle;
receive, at the vehicle, configuration information from the computer of the vehicle manufacturer, the configuration information providing selective access to a portion of the vehicle for the automotive service while disabling access to another portion of the vehicle;
based on the authorization information received by the vehicle and the configuration information received at the vehicle from the computer of the vehicle manufacturer, open the diagnostic port that was closed to accept access from an external device of the authorized repair entity to perform the automotive service, wherein the opening of the diagnostic port to accept access from the external device is responsive to verifying that a repair entity attempting to perform the automotive service is the authorized repair entity identified by the vehicle manufacturer authorization information received by the vehicle over the network from the computer of the vehicle manufacturer, and the diagnostic port is opened responsive to a setting from the computer of the vehicle manufacturer; and
after the opening of the diagnostic port, perform, at the vehicle, diagnostic tests through the opened diagnostic port and communicate, by an electronic component of the vehicle, with the external device through the opened diagnostic port.

20. The vehicle of claim 19, wherein the setting from the computer of the vehicle manufacturer comprises a list of Electron Control Unit (ECU) identifiers of ECUs of the vehicle to which access is allowed.

* * * * *